(12) United States Patent
Yamamoto (10) Patent No.: US 7,030,937 B2
(45) Date of Patent: Apr. 18, 2006

(54) SIMPLIFIED TV TUNER INTERMEDIATE FREQUENCY CIRCUIT

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 567 days.

(21) Appl. No.: 10/422,181

(22) Filed: Apr. 24, 2003

(65) Prior Publication Data

US 2003/0202125 A1      Oct. 30, 2003

(30) Foreign Application Priority Data

Apr. 24, 2002     (JP) .............................. 2002-121781

(51) Int. Cl.
*H04N 5/44*    (2006.01)
*H04N 5/46*    (2006.01)
*H04N 5/50*    (2006.01)

(52) U.S. Cl. ....................... 348/729; 348/731; 348/736; 455/63.1; 455/311

(58) Field of Classification Search ................ 348/729, 348/731, 725, 735–738, 470; 455/311, 334, 455/63.1, 150.1; H04N 5/44, 5/46, 5/50
See application file for complete search history.

(56) References Cited

U.S. PATENT DOCUMENTS

| | | | | |
|---|---|---|---|---|
| 4,716,464 | A * | 12/1987 | Parker | 348/737 |
| 5,644,368 | A * | 7/1997 | Natsume | 348/737 |
| 5,864,373 | A * | 1/1999 | Hatano | 348/737 |
| 6,342,928 | B1 * | 1/2002 | Ohira | 348/729 |
| 6,351,294 | B1 * | 2/2002 | Yamamoto et al. | 348/731 |
| 6,445,425 | B1 * | 9/2002 | Limberg | 348/731 |
| 6,573,940 | B1 * | 6/2003 | Yang | 348/441 |
| 6,583,826 | B1 * | 6/2003 | Sawamoto et al. | 348/731 |
| 6,683,656 | B1 * | 1/2004 | Kikuchi | 348/729 |
| 6,731,348 | B1 * | 5/2004 | Osada et al. | 348/729 |
| 6,791,626 | B1 * | 9/2004 | Yamamoto et al. | 348/729 |
| 6,795,128 | B1 * | 9/2004 | Yamamoto | 348/729 |
| 6,876,401 | B1 * | 4/2005 | Yamamoto | 348/729 |
| 6,876,402 | B1 * | 4/2005 | Sasaki | 348/731 |
| 6,927,805 | B1 * | 8/2005 | Yamamoto | 348/729 |

FOREIGN PATENT DOCUMENTS

JP      HEI 10-341382      12/1998

* cited by examiner

*Primary Examiner*—Brian P. Yenke
(74) *Attorney, Agent, or Firm*—Brinks Hofer Gilson & Lione (57) ABSTRACT

Between a mixer and an intermediate frequency amplifying circuit, there are an intermediate frequency tuning circuit which, for reception of a TV signal, is tuned between a chrominance subcarrier frequency and a video intermediate frequency in an intermediate frequency band, and for reception of an FM broadcasting signal, is tuned nearly to the chrominance subcarrier frequency, and a first trap circuit which attenuates a sound intermediate frequency of an adjacent channel. Next to the intermediate frequency amplifying circuit, there is a second trap circuit which, for reception of a TV signal, brings about attenuation between the video intermediate frequency in the intermediate frequency band and the sound intermediate frequency of the adjacent channel and, for reception of an FM broadcasting signal, brings about attenuation around the video intermediate frequency.

6 Claims, 5 Drawing Sheets

SIMPLIFIED TV TUNER INTERMEDIATE FREQUENCY CIRCUIT

BACKGROUND OF THE INVENTION

1. Field of the Invention

The present invention relates to a television receiver which can receive TV signals or FM broadcasting signals.

2. Description of the Related Art

Figure 5:
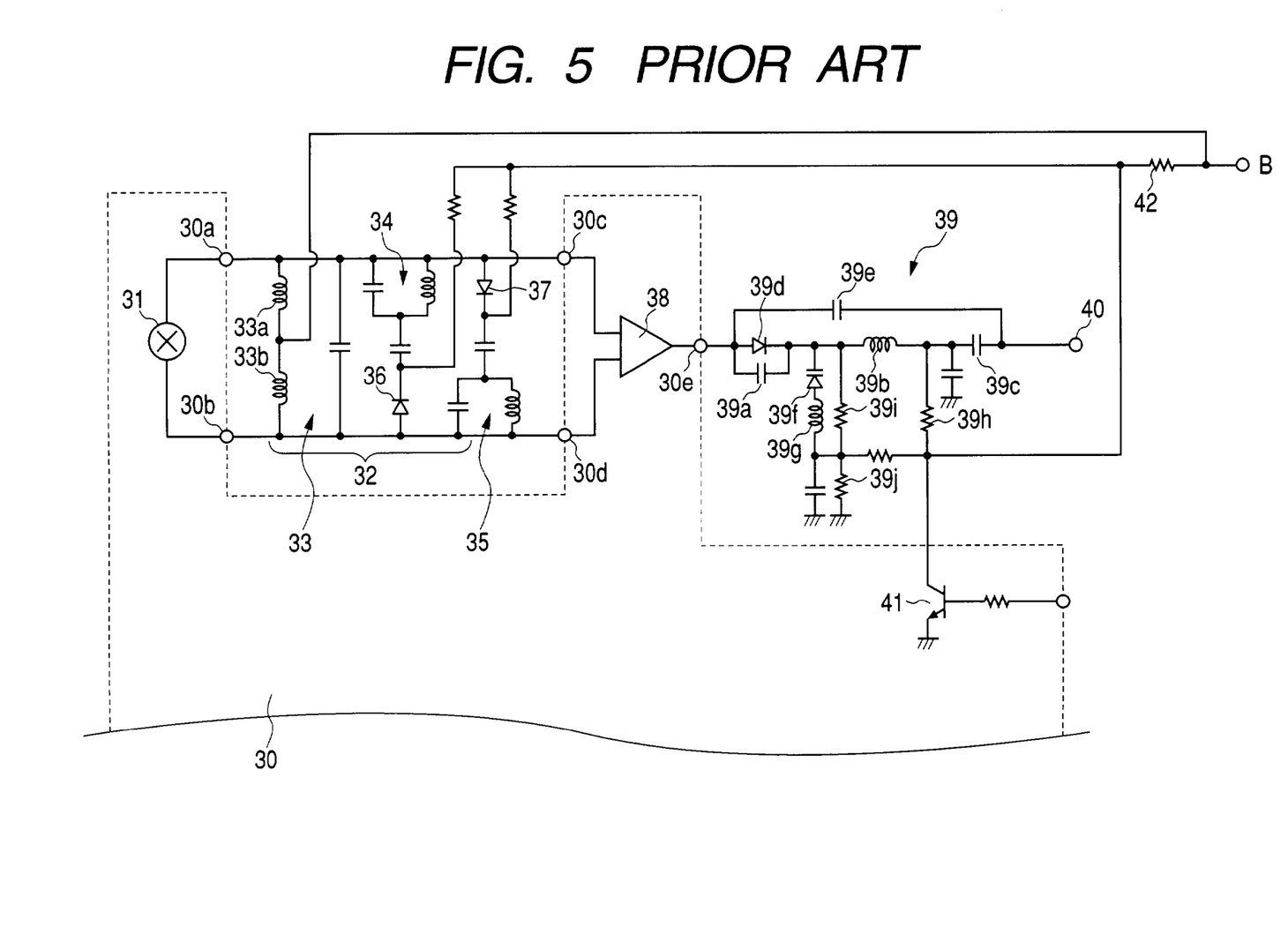
FIG. 5 is a circuit diagram showing a conventional TV tuner intermediate frequency circuit.

The structure of a conventional television receiver is shown in FIG. 5. A mixer 31 is incorporated in an integrated circuit 30 and there are a tuning circuit, an amplifier and so on (not shown) outside of the circuit 30. A TV signal or an FM broadcasting signal which is selected by this tuning circuit is sent to the mixer 31. Using a local oscillation signal sent from a local oscillator (not shown) located in the integrated circuit 30, the mixer 31 converts the frequency of the TV signal into a frequency in the TV intermediate frequency band (54 MHz to 60 MHz in accordance with the Japanese channel specification), or the frequency of the FM broadcasting signal into a chrominance subcarrier frequency (C) in the intermediate frequency band. The frequency-converted TV signal or FM broadcasting signal is outputted in a balanced form through a balanced output terminal 30a or 30b of the integrated circuit 30 and sent to a balanced intermediate frequency tuning circuit 32.

The intermediate frequency tuning circuit 32 is made up of three (first, second, and third) tuning circuits 33, 34, 35 which are connected in parallel, and the second tuning circuit 34 and the third tuning circuit 35 can be connected with the first tuning circuit 33 through a first switch diode 36 and a second switch diode 37, respectively. Line voltage B is supplied to the mixer 31 through inductors 33a and 33b of the first tuning circuit 33. Line voltage B is also supplied to the anodes of the first switch diode 36 and the second switch diode 37 through the inductors 33a and 33b. When a TV signal is received, the first and second switch diodes 36 and 37 are turned off and only the first tuning circuit 33 in the intermediate frequency tuning circuit 32 is effective and tuned between a video intermediate frequency (P) and a chrominance subcarrier frequency (C) in the intermediate frequency band.

On the other hand, when an FM broadcasting signal is received, the first and second switch diodes 36 and 37 are turned on. The first tuning circuit 33 is connected in parallel to the second and third tuning circuits 34 and 35, which increases the Q factor for the tuning circuitry and causes tuning around the chrominance subcarrier frequency (C).

Next to the intermediate frequency tuning circuit 32 is a balanced input/unbalanced output intermediate frequency amplifying circuit 38 which is incorporated in the integrated circuit 30. The input ends of the intermediate frequency tuning circuit 32 and the intermediate frequency amplifying circuit 38 are connected to the balanced input terminals 30c and 30d of the integrated circuit 30. The unbalanced output end of the intermediate frequency amplifying circuit 38 is connected to an unbalanced output terminal 30e of the integrated circuit 30. Voltage is supplied from the intermediate frequency amplifying circuit 38 to this unbalanced output terminal 30e which is connected with a trap circuit 39. The trap circuit 39 has a first capacitor 39a, a first inductor 39b, and a second capacitor 39c which are connected in series from the unbalanced output terminal 30e to an intermediate frequency output end 40, in the order of mention. The first capacitor 39a is connected in parallel to a third switch diode 39d. Also, a third capacitor 39e is connected between the unbalanced output terminal 30e and IF output end 40. A series circuit from the point of connection between the first capacitor 39a and the first inductor 39b, which includes a varactor diode 39f and a second inductor 39g, is connected to the ground.

In addition, the cathode of a third switch diode 39d and the cathode of a varactor diode 39f are connected in series with the collector of a switch transistor 41 through the first inductor 39b and a resistor 39h. Line voltage is applied through a pull-up resistor 42 to the collector. The switch transistor 41 is also incorporated in the integrated circuit 30. The anode of the varactor diode 39f is biased by the resistors 39i and 39j. The cathodes of the first and second switch diodes 36 and 37 are also connected to the collector of the switch transistor 41.

In the above structure, when a TV signal is received, the switch transistor 41 is turned off. This turns off the first and second diodes 36 and 37 and causes the intermediate frequency tuning circuit 32 to operate as described above. Also, the third switch diode 39f is turned off. Therefore, the first capacitor 39a, first inductor 39b and second capacitor 39c which are serially interconnected, combined with the third capacitor 39e connected in parallel to all these, constitute a parallel resonant circuit whose resonance frequency is equal to the video intermediate frequency (–P) of the adjacent channel. Also, as line voltage is applied to the cathode of the varactor diode 39f, the series resonance frequency for the varactor diode 39f and the second inductor 39g is equal to the sound intermediate frequency (–S) of the adjacent channel.

Figure 6:
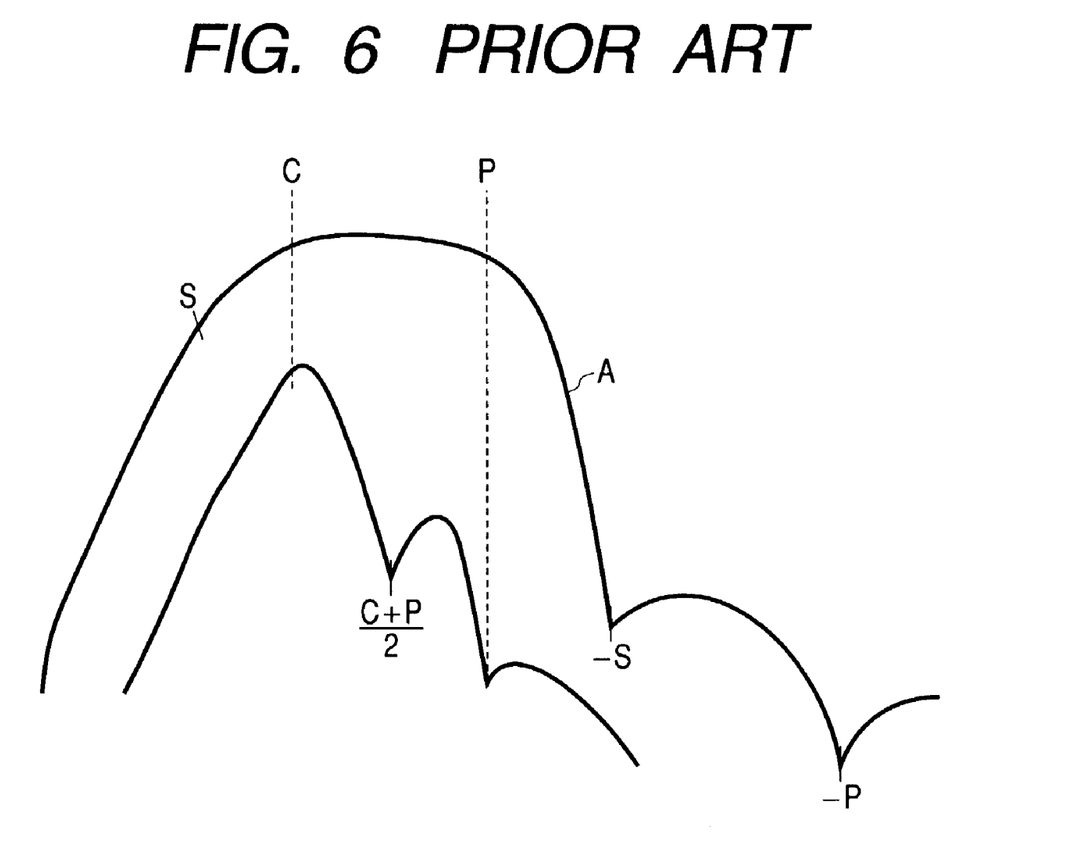
FIG. 6 is a transmission characteristic graph concerning the conventional TV tuner intermediate frequency circuit.

Therefore, the overall transmission characteristic of the intermediate frequency tuning circuit 32 and the trap circuit 39 is as indicated by A in FIG. 6: namely attenuation occurs at the adjacent channel's video intermediate frequency (–P) and at the sound intermediate frequency (–S).

On the other hand, when an FM broadcasting signal is received, the switch transistor 41 is turned on. This turns on the first and second diodes 36 and 37 and causes the intermediate frequency tuning circuit 32 to operate in the same way as described above, except that, since the Q factor for the tuning circuit increases, there occurs a sharp change in the tuning characteristic, resulting in increased loss and signal level decline. Also the third switch diode 39f is turned on. Therefore, the first inductor 39b and second capacitor 39c which are serially interconnected, combined with the third capacitor 39e connected in parallel to all these, constitute a parallel resonant circuit whose resonance frequency goes down to the level of the video intermediate frequency (P). Also, the voltage of the cathode of the varactor diode 39f decreases, the series resonance frequency for the varactor diode 39f and the second inductor 39g is nearly equal to the middle point between the video intermediate frequency and chrominance subcarrier frequency ((C+P)/2).

Therefore, the overall transmission characteristic of the intermediate frequency tuning circuit 32 and the trap circuit 39 is as indicated by B in FIG. 6: namely attenuation occurs nearly at the middle point ((C+P)/2) between the video intermediate frequency and chrominance subcarrier frequency, and at the video intermediate frequency (P). However, the level at the tuning point C (chrominance subcarrier frequency) is lower than when a TV signal is received.

The conventional TV tuner intermediate frequency circuit as explained above uses three intermediate frequency tuning circuits and the trap circuit generates two trapping frequencies. For this reason, it has been necessary to use a larger number of components outside of the integrated circuit. As a result, it has been difficult to reduce the cost of the intermediate frequency circuit and decrease its size.

SUMMARY OF THE INVENTION

Hence, the primary object of the present invention is to simplify the intermediate frequency tuning circuit and trap circuit which are made outside of the integrated circuit, and to decrease the number of components used to reduce the cost of the intermediate frequency circuit and make it more compact.

According to an aspect of the present invention, there is provided a TV tuner intermediate frequency circuit having: a mixer which converts the frequency of a TV signal or an FM broadcasting signal into a frequency in a TV intermediate frequency band; and an intermediate frequency amplifying circuit which amplifies the intermediate frequency signal, wherein between the mixer and the intermediate frequency amplifying circuit there are: an intermediate frequency tuning circuit which, for reception of the TV signal, is tuned between a chrominance subcarrier frequency and a video intermediate frequency in the intermediate frequency band, and for reception of the FM broadcasting signal, is tuned nearly to the chrominance subcarrier frequency; and a first trap circuit which attenuates a sound intermediate frequency of an adjacent channel; and next to the intermediate frequency amplifying circuit there is: a second trap circuit which, for reception of the TV signal, brings about attenuation between the video intermediate frequency in the intermediate frequency band and the sound intermediate frequency of the adjacent channel and, for reception of the FM broadcasting signal, brings about attenuation around the video intermediate frequency.

According to another aspect of the invention, the intermediate frequency tuning circuit and the intermediate frequency amplifying circuit are tightly coupled for reception of the TV signal, and loosely coupled for reception of the FM broadcasting signal.

According to another aspect of the invention, there is a first switch diode for coupling the intermediate frequency tuning circuit and the intermediate frequency amplifying circuit, and the first switch diode is turned on for reception of the TV signal, and off for reception of the FM broadcasting signal.

According to another aspect of the invention, the intermediate frequency amplifying circuit is made up of a negative feedback amplifying circuit, and the negative feedback is increased for reception of the TV signal, and decreased for reception of the FM broadcasting signal.

According to another aspect of the invention, the intermediate frequency amplifying circuit is made up of a balanced amplifying circuit having balanced input ends and balanced output ends, and feedback resistors are connected between the balanced input ends and the balanced output ends respectively; one of the balanced output ends is connected with the second trap circuit, and the other balanced output end is terminated by a series circuit with a second switch diode and a capacitor; and the second switch diode is turned off for reception of the TV signal and on for reception of the FM broadcasting signal.

According to another aspect of the invention, the second trap circuit at least has an inductor, a plurality of capacitors and a third switch diode connected in parallel to one of the capacitors; and the third switch diode is turned off for reception of the TV signal and on for reception of the FM broadcasting signal.

DETAILED DESCRIPTION OF THE PREFERRED EMBODIMENTS

Figure 1:
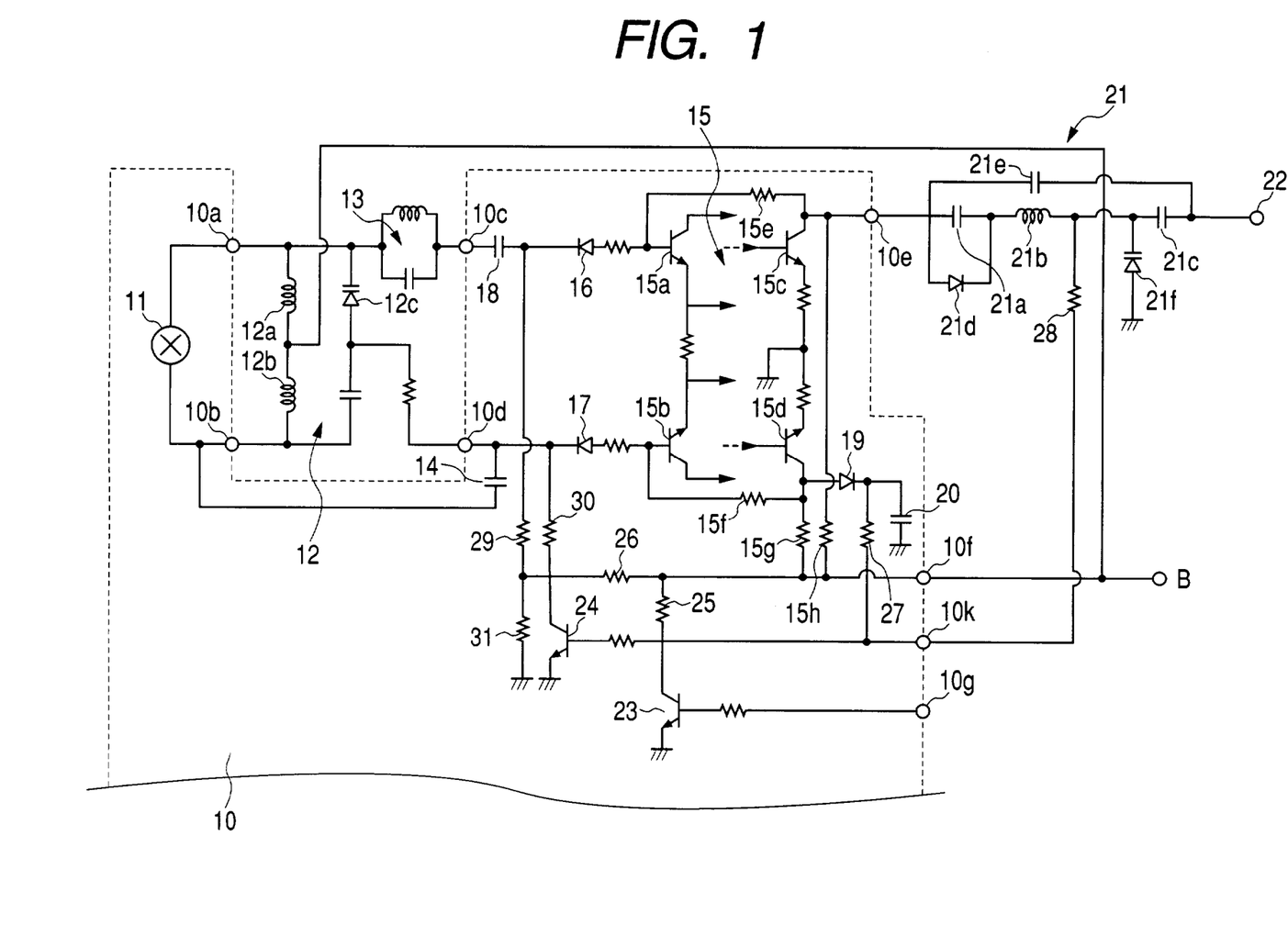
FIG. 1 is a circuit diagram showing the structure of a TV tuner intermediate frequency circuit according to the present invention.
Figure 2:
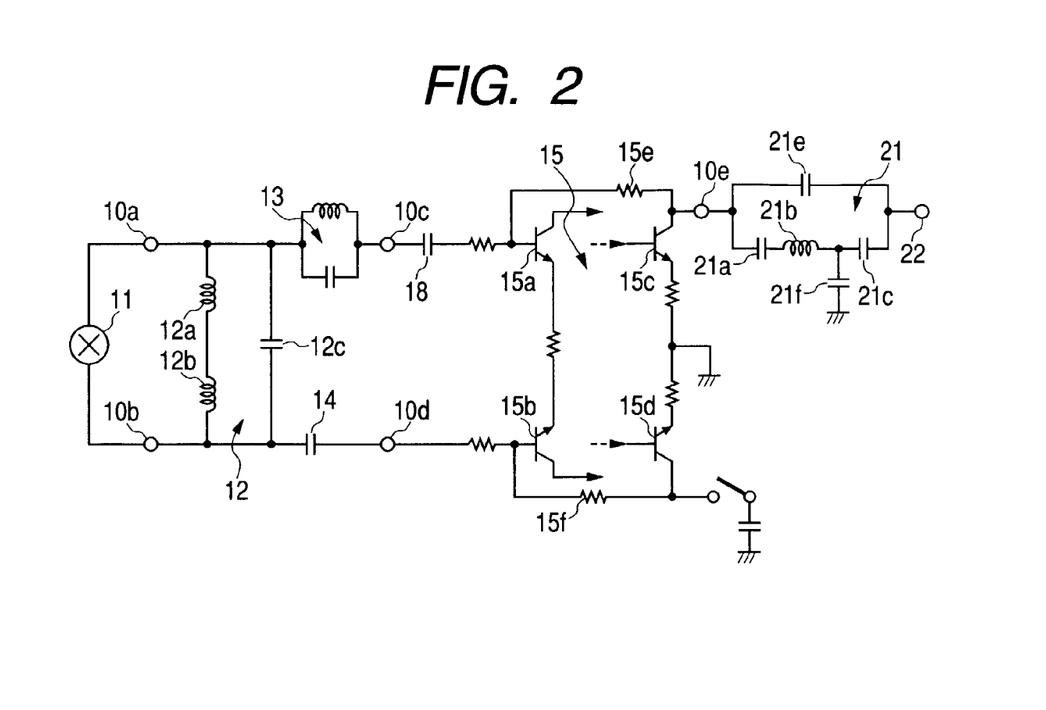
FIG. 2 is an equivalent circuit diagram showing the TV tuner intermediate frequency circuit for reception of a TV signal according to the present invention.
Figure 3:
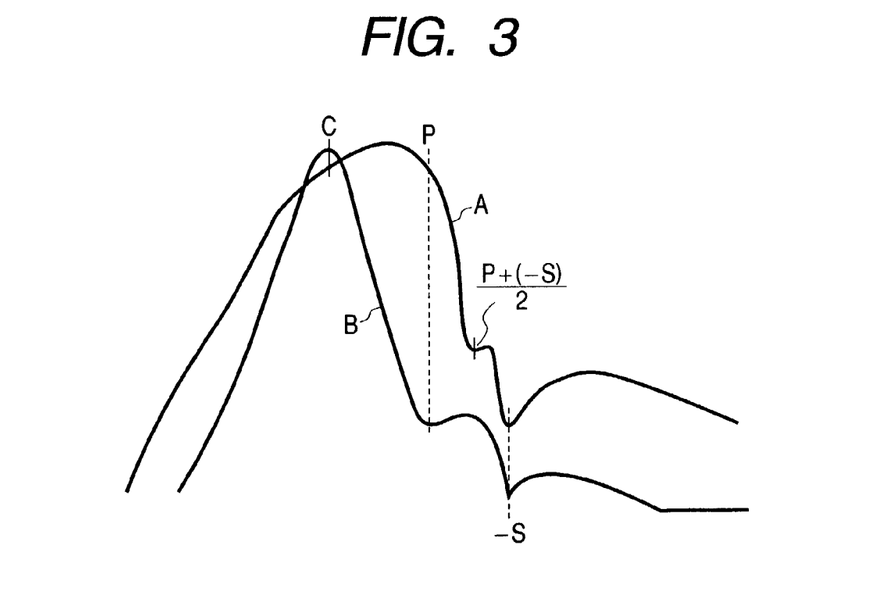
FIG. 3 shows the transmission characteristic of the TV tuner intermediate frequency circuit according to the present invention.
Figure 4:
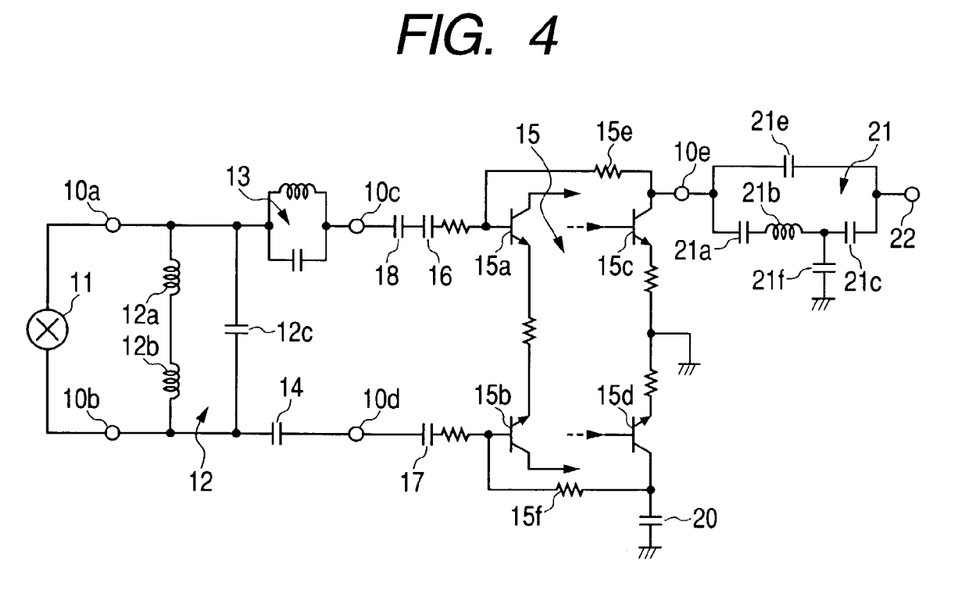
FIG. 4 is an equivalent circuit diagram showing the TV tuner intermediate frequency circuit for reception of an FM broadcasting signal according to the present invention.

Next, the TV tuner intermediate frequency circuit according to the present invention (hereinafter simply called the "intermediate frequency circuit") will be described referring to the accompanying drawings. FIG. 1 shows the structure of an intermediate frequency circuit according to the present invention. FIG. 2 shows an equivalent circuit for reception of a TV signal. FIG. 3 shows the transmission characteristic. FIG. 4 shows an equivalent circuit for reception of an FM broadcasting signal.

As shown in FIG. 1, a mixer 11 is incorporated in an integrated circuit 10 and there are a tuning circuit and an amplifier (not shown) outside of the integrated circuit 10. A TV signal or an FM broadcasting signal which is selected by this tuning circuit is sent to the mixer 11. Using a local oscillation signal sent from a local oscillator (not shown) located in the integrated circuit 10, the mixer 11 converts the frequency of the TV signal into a frequency in the TV intermediate frequency band (54 MHz to 60 MHz in accordance with the Japanese channel specification), or the frequency of the FM broadcasting signal into a chrominance subcarrier frequency (C) in the intermediate frequency band. The frequency-converted TV signal or FM broadcasting signal is outputted through a balanced output terminal 10a or 10b of the integrated circuit 10 and sent to a balanced intermediate frequency tuning circuit 12 which is located outside of the integrated circuit 10.

The intermediate frequency tuning circuit 12 has two tuning inductors 12a and 12b which are connected in series between balanced output terminals 10a and 10b and supply power to the mixer 11, and a first varactor diode 12c which is connected in parallel to these inductors. Line voltage B (5 V) is applied to the connection points of the two inductors 12a and 12b. Line voltage B is also applied through the inductor 12a to the cathode of the first varactor diode 12c. In the integrated circuit 10, there are balanced input terminals 10c and 10d where the balanced output terminal 10a is connected with the balanced input terminal 10c by a first trap circuit 13 which is outside of the integrated circuit 10. The first trap circuit 13 is made up of a parallel resonant circuit whose resonance frequency is almost equal to the sound intermediate frequency (−S) of the adjacent channel. The other balanced output terminal 10b and the other balanced input terminal 10d are connected by a second capacitor 14 for coupling which is incorporated in the integrated circuit 10. The anode of the first varactor diode 12c is, on a direct-current basis, connected with the balanced input terminal 10d but, on a high-frequency basis, insulated from it.

There is a balanced intermediate frequency amplifying circuit 15 in the integrated circuit 10. The intermediate frequency amplifying circuit 15 has amplifying transistors 15a and 15b for the initial stage and amplifying transistors 15c and 15d for the final stage. The bases of the transistors 15a and 15b for the initial stage serve as balanced input ends while the collectors of the transistors 15c and 15d for the final stage serve as balanced output ends. There are a first switch diode 16 between the balanced input terminal 10c and the base of the transistor 15a, and,a first switch diode 17 between the other balanced input terminal 10d and the base of the other transistor 15b. The anode of the first switch diode 16 is connected to the base of the transistor 15a and its cathode is connected through the first capacitor 18 for coupling to the balanced input terminal 10c. The anode of the other first switch diode 17 is connected to the base of the other transistor 15b and its cathode is connected to the other balanced input terminal 10d.

A feedback resistor 15e is connected between the base of the transistor 15a (initial stage) and the collector of the transistor 15c (final stage); similarly a feedback resistor 15f is connected between the base of the transistor 15b (initial stage) and the collector of the transistor 15d (final stage). Also, the collector of the transistor 15c is connected to the unbalanced output terminal 10e of the integrated circuit 10. Furthermore, the collectors of the transistors 15c and 15d are connected to the power terminal 10f of the integrated circuit 10 through feeding resistors 15g and 15h, respectively. Line voltage B is supplied to the power terminal 10f. The anode of the second switch diode 19 is connected to the collector of the other transistor 15d and its cathode is grounded through a third capacitor 20 for termination. Therefore, the intermediate frequency amplifying circuit 15 operates on a balanced input/unbalanced output basis.

One end of a second trap circuit 21 is connected with the unbalanced output terminal 10e and its other end is connected with an intermediate frequency output terminal 22. The second trap circuit 21 has a fourth capacitor 21a, an inductor 21b and a fifth capacitor 21c which are connected in series between the unbalanced output terminal 10e and the intermediate frequency output terminal 22, and a third switch diode 21d connected in parallel to the fourth capacitor 21a, and a sixth capacitor 21e connected between the unbalanced output terminal 10e and the intermediate frequency output terminal 22. Also, the cathode of a second varactor diode 21f is connected at the point of connection of the inductor 21b and the fifth capacitor 21c and its anode is grounded.

In the integrated circuit 10, there are two transistors 23 and 24 whose emitters are grounded. Their collectors are connected to the power terminal 10f through pull-up resistors 25 and 26. The base of the first switch transistor 23 is connected to the switching terminal 10g of the integrated circuit 10 and its collector is connected to the base of the second switch transistor 24 and also connected through a resistor 27 to the cathode of the second switch diode 19 in the integrated circuit 10. The collector is also connected to the relay terminal 10h of the integrated circuit 10 and the relay terminal 10h and the cathode of a third switch diode 21d in the second trap circuit 21 are connected through a resistor 28.

The collector of the second switch transistor 24 is connected through resistors 29 and 30 to the cathodes of the first switch diodes 16 and 17 respectively and grounded through a resistor 31.

In the above-mentioned structure, when a TV signal is received, a low level switching voltage is applied on the switching terminal 10g to turn off the first switch transistor 23. This turns on the second switch transistor 24. As a result, since the voltage of the anode of the first varactor diode 12c becomes 0.09 V or so, the intermediate frequency tuning circuit 12 is tuned between the chrominance subcarrier frequency (C) and the video intermediate frequency (P) depending on the capacitance of the first varactor diode 12c at this moment. Then, the first switch diodes 16 and 17 are turned on and the intermediate frequency amplifying circuit 15 is tightly coupled with the intermediate frequency tuning circuit 12. As a result, the input impedance of the intermediate frequency amplifying circuit 15 is added to the intermediate frequency tuning circuit 12. In this condition, the Q factor for tuning is adjusted to the intermediate frequency tuning characteristic for reception of a TV signal.

Since the second switch diode 19 is turned off, the third capacitor 20 is isolated from the collector of the transistor 15d and the negative feedback of the intermediate frequency amplifying circuit 15 increases and the gain at that moment is properly limited. The third switch diode 21d is also turned off, and therefore the fourth capacitor 21a, inductor 21b, fifth capacitor 21c and sixth capacitor 21e constitute a parallel resonant circuit. The resonance frequency at this moment is set nearly to the middle point between the video intermediate frequency (P) and the sound intermediate frequency of the adjacent channel (−S). This setting is determined depending on the capacitance of the second varactor diode 21f.

Thus, the equivalent circuit which extends from the mixer 11 to the second trap circuit 21 is as shown in FIG. 2. The overall transmission characteristic of the circuitry which combines the intermediate frequency tuning circuit 12, first trap circuit 13 and second trap circuit 21 is as indicated by A in FIG. 3: namely attenuation occurs nearly at the middle point (P+(−S))/2 between the video intermediate frequency (P) and the sound intermediate frequency (−S) of the adjacent channel and also at the sound intermediate frequency (−S) of the adjacent channel.

On the other hand, when an FM broadcasting signal is received, a high level switching voltage is applied on the switching terminal 10g to turn on the first switch transistor 23. This turns off the second switch transistor 24. As a result, since the voltage of the cathode of the first varactor diode 12c becomes 3.2 V or so (increase in capacitance), the intermediate frequency tuning circuit 12 is tuned nearly to the chrominance subcarrier frequency depending on the capacitance of the first varactor diode 12c at this moment. Then, the first switch diodes 16 and 17 are turned off with very small capacitance values and the intermediate frequency amplifying circuit 15 is loosely coupled with the intermediate frequency tuning circuit 12. As a result, the intermediate frequency tuning circuit 12 is not so affected by the input impedance of the intermediate frequency amplifying circuit 15 and the Q factor for tuning becomes higher.

Since the second switch diode 19 is turned on, the collector of the transistor 15d is terminated by the third capacitor 20 and the negative feedback of the intermediate frequency amplifying circuit 15 decreases and the gain increases. The third switch diode 21d is also turned on, and therefore the inductor 21b, fifth capacitor 21c and sixth capacitor 21e constitute a parallel resonant circuit. The resonance frequency at this moment is lower than when a TV signal is received, or nearly equal to the video intermediate frequency (P). This setting is determined depending on the capacitance of the second varactor diode 21f.

Thus, the equivalent circuit which extends from the mixer 11 to the second trap circuit 21 is as shown in FIG. 4. The overall transmission characteristic of the circuitry which combines the intermediate frequency tuning circuit 12, first trap circuit 13 and second trap circuit 21 is as indicated by B in FIG. 3: namely attenuation occurs at two points: the video intermediate frequency (P) and the sound intermediate frequency (−S) of the adjacent channel. Since the negative feedback decreases, the level of the chrominance subcarrier frequency (C) rises nearly to the same level as the peak level which is reached when a TV signal is received.

As described above, between the mixer and the intermediate frequency amplifying circuit there are: an intermediate frequency tuning circuit which, for reception of the TV signal, is tuned between a chrominance subcarrier frequency and a video intermediate frequency in the intermediate frequency band, and for reception of the FM broadcasting signal, is tuned nearly to the chrominance subcarrier frequency; and a first trap circuit which attenuates a sound intermediate frequency of an adjacent channel; and next to the intermediate frequency amplifying circuit there is: a second trap circuit which, for reception of the TV signal, brings about attenuation between the video intermediate frequency in the intermediate frequency band and the sound intermediate frequency of the adjacent channel and, for reception of the FM broadcasting signal, brings about attenuation around the video intermediate frequency. As a result, the structures of the intermediate frequency tuning circuit and first and second trap circuits are simplified.

Further, the intermediate frequency tuning circuit and the intermediate frequency amplifying circuit are tightly coupled for reception of the TV signal, and loosely coupled for reception of the FM broadcasting signal. As a result, in tuning to the intermediate frequency band, the Q factor increases for reception of a TV signal, and decreases for reception of an FM broadcasting signal.

Further, there is a first switch diode for coupling the intermediate frequency tuning circuit and the intermediate frequency amplifying circuit, and the first switch diode is turned on for reception of the TV signal, and off for reception of the FM broadcasting signal. As a result, the coupling of the intermediate frequency tuning circuit and intermediate frequency amplifying circuit can be changed to the tight coupling mode or the loose coupling mode.

Further, the intermediate frequency amplifying circuit is made up of a negative feedback amplifying circuit, and the negative feedback is increased for reception of the TV signal, and decreased for reception of the FM broadcasting signal. As a result, when an FM broadcasting signal is received, the signal level in the intermediate frequency band can be made equivalent to the signal level which is used when a TV signal is received.

Further, the intermediate frequency amplifying circuit is made up of a balanced amplifying circuit having balanced input ends and balanced output ends, and feedback resistors are connected between the balanced input ends and the balanced output ends respectively; one of the balanced output ends is connected with the second trap circuit, and the other balanced output end is terminated by a series circuit with a second switch diode and a capacitor; and the second switch diode is turned off for reception of the TV signal and on for reception of the FM broadcasting signal. As a result, the gain of the balanced intermediate frequency amplifying circuit can be changed.

Further, the second trap circuit at least has an inductor, a plurality of capacitors and a third switch diode connected in parallel to one of the capacitors; and the third switch diode is turned off for reception of the TV signal and on for reception of the FM broadcasting signal. As a result, the frequency to be attenuated can be easily changed.

What is claimed is:

1. A TV tuner intermediate frequency circuit comprising:
    a mixer which converts a frequency of one of a TV signal and an FM broadcasting signal into a frequency in a TV intermediate frequency band; and
    an intermediate frequency amplifying circuit which amplifies the intermediate frequency signal, wherein
    between the mixer and the intermediate frequency amplifying circuit there are:
    an intermediate frequency tuning circuit which, for reception of the TV signal, is tuned between a chrominance subcarrier frequency and a video intermediate frequency in the intermediate frequency band, and for reception of the FM broadcasting signal, is tuned nearly to the chrominance subcarrier frequency; and
    a first trap circuit which attenuates a sound intermediate frequency of an adjacent channel; and
    next to the intermediate frequency amplifying circuit there is:
    a second trap circuit which, for reception of the TV signal, brings about attenuation between the video intermediate frequency in the intermediate frequency band and the sound intermediate frequency of the adjacent channel and, for reception of the FM broadcasting signal, brings about attenuation around the video intermediate frequency.

2. The TV tuner intermediate frequency circuit according to claim 1, wherein the intermediate frequency tuning circuit and the intermediate frequency amplifying circuit are tightly coupled for reception of the TV signal, and loosely coupled for reception of the FM broadcasting signal.

3. The TV tuner intermediate frequency circuit according to claim 2, wherein there is a first switch diode for coupling the intermediate frequency tuning circuit and the intermediate frequency amplifying circuit, and the first switch diode is turned on for reception of the TV signal, and off t for reception of the FM broadcasting signal.

4. The TV tuner intermediate frequency circuit according to claim 1, wherein the intermediate frequency amplifying circuit comprises a negative feedback amplifying circuit in which negative feedback is increased for reception of the TV signal and decreased for reception of the FM broadcasting signal.

5. The TV tuner intermediate frequency circuit according to claim 4, wherein the intermediate frequency amplifying circuit comprises a balanced amplifying circuit having balanced input ends and balanced output ends and feedback resistors are connected between the balanced input ends and the balanced output ends respectively; one of the balanced output ends is connected with the second trap circuit and the other balanced output end is terminated by a series circuit with a second switch diode and a capacitor; and the second switch diode is turned off for reception of the TV signal and on for reception of the FM broadcasting signal.

6. The TV tuner intermediate frequency circuit according to claim 5, wherein the second trap circuit at least has an inductor, a plurality of capacitors and a third switch diode connected in parallel to one of the plurality of capacitors: and the third switch diode is turned off for reception of the TV signal and on for reception of the FM broadcasting signal.

* * * * *

UNITED STATES PATENT AND TRADEMARK OFFICE
CERTIFICATE OF CORRECTION

PATENT NO.       : 7,030,937 B2                                          Page 1 of 1
APPLICATION NO.  : 10/422181
DATED            : April 18, 2006
INVENTOR(S)      : Masaki Yamamoto It is certified that error appears in the above-identified patent and that said Letters Patent is hereby corrected as shown below:

<u>In the Claims</u>

Column 8, in claim 6, line 62, immediately after "plurality of capacitors" delete ":" (colon) and substitute --;-- (semicolon) in its place.

Signed and Sealed this

Twelfth Day of September, 2006

JON W. DUDAS
*Director of the United States Patent and Trademark Office*